J. A. STRATTON.
APPARATUS FOR REGULATION OF HEATING SYSTEMS.
APPLICATION FILED APR. 17, 1914.
1,129,433.
Patented Feb. 23, 1915.
2 SHEETS—SHEET 2.
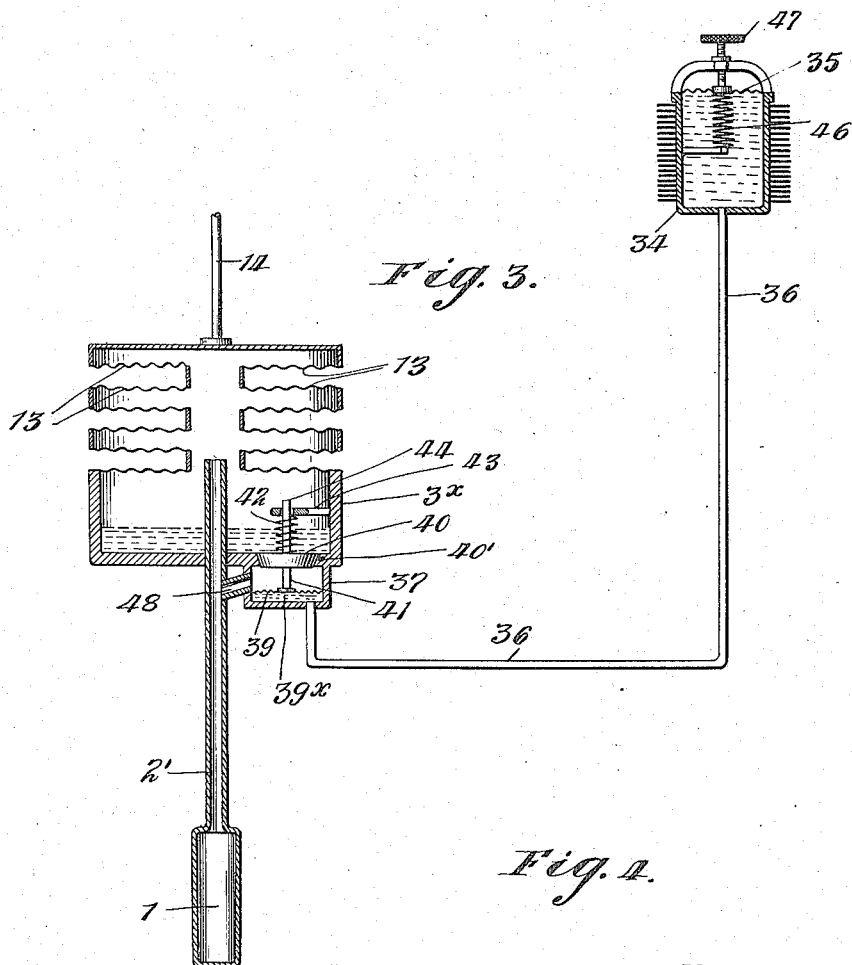
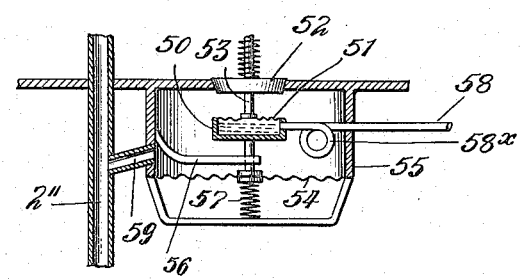

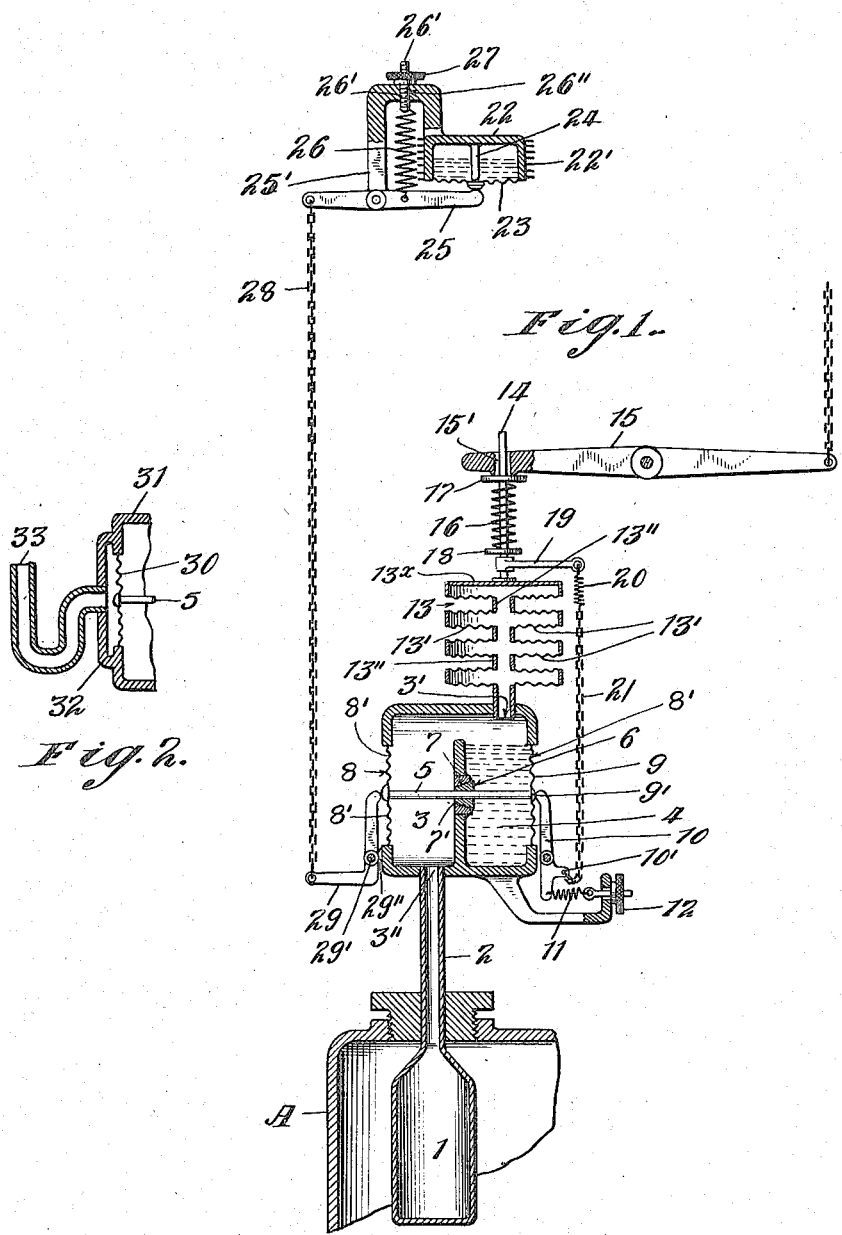

UNITED STATES PATENT OFFICE.

JULIAN A. STRATTON, OF CHICAGO, ILLINOIS.

APPARATUS FOR REGULATION OF HEATING SYSTEMS.

1,129,433.  Specification of Letters Patent.  Patented Feb. 23, 1915.

Application filed April 17, 1914. Serial No. 832,420.

*To all whom it may concern:*

Be it known that I, JULIAN A. STRATTON, a citizen of the United States of America, residing at Chicago, in the county of Cook and State of Illinois, have invented certain new and useful Improvements in Apparatus for Regulation of Heating Systems, of which the following is a specification, reference being had to the accompanying drawings.

This invention relates to an apparatus for the automatic regulation of heating systems; and an object of this invention is to retain, in a completely self-operative or fully automatic system, the desirable feature of freedom from necessity of periodical attention common to such systems and, at the same time, to secure the advantages of sensitiveness and of positive and reliable operation found in devices of the semi-automatic type involving the use of an auxiliary source of power, such as a mechanical or electrical motor controlled by a thermostat.

The apparatus which I hereinafter describe utilizes for the operation of dampers, valves or other controlling devices, the expansive force generated by a volatile liquid exposed to heat, the action of the heat upon the liquid being controlled by a suitable thermostat placed at the point from which the temperature is to be controlled.

I am aware that there are at present many devices depending upon the thermal expansion of liquids or gases under the influence of the heat of the heating system itself or of some auxiliary source of heat, and upon the variation of such influence by means of thermostatic devices.

The novelty of my invention lies in the manner in which the application of the heat of the heating system to a volatile liquid is effected and controlled, whereby sensitiveness and powerful action are obtained with a very simple and durable construction.

The essential features are that, upon the opening of a valve controlled by a suitable thermostat, a volatile liquid is allowed to flow by gravity into contact with a heated surface, thus vaporizing the volatile liquid, and producing the necessary mechanical force for the operation of the controlling devices by the increased vapor pressure exerted against a diaphragm or similar device due to its expansion. The closing of this same valve by the thermostat serves to retain the liquid from contact with the heated surface, and consequently to reduce the pressure against the diaphragm or other device, by simply trapping the condensed vapor returning by gravity from a suitable condenser exposed to a lower temperature, thus preventing the liquid coming into contact with the heated surface until the valve is again opened by the thermostat.

The form which the apparatus may take will vary considerably, of course, depending upon the purpose for which it is applied and the conditions under which it is required to operate, as well as upon the form of controlling thermostat used. The essential features of operation, however, remain the same.

In the drawings illustrating the principle of this invention and the best mode now known to me of applying that principle, Figure 1 is a sectional view, diagrammatic in character, of my new automatic regulating apparatus; Fig. 2 is a detail showing a modification of the expansion chamber and the connection of the thermostat therewith; Fig. 3 illustrates a modified form of my new apparatus; and Fig. 4 is a detail which illustrates a modified form of safety device and thermostat connection for use with the apparatus shown in Fig. 3.

Referring to the drawings, a suitable receptacle or chamber 1 is placed so as to be exposed preferably to the internal heat of the heating system to be regulated, although an auxiliary source of heat may be employed, if desired. Thus, when the system is used for controlling the dampers of steam or hot-water boilers, the chamber 1 may be placed within a shell A and in contact with the furnace gases or with the steam or hot water; while in the case of hot-air furnaces, it may be placed in contact with the heated air or furnace gases. When used to control the temperature in some part of a heated area by controlling-valves or dampers in the service pipes, the chamber 1 would be placed so as to be exposed to the heat of the steam, hot water or air as the case might be.

The chamber 1 is connected by a pipe 2 with the chamber 3 removed somewhat from the influence of the heat acting upon the chamber 1. The chamber 3 has a reservoir 4 in which the volatile liquid may be trapped. Through the side of the reservoir 4 extends a rod 5 carrying a valve member 6 which rests normally against its seat 7, thereby closing the opening 7'. The rod 5 is attached at its ends to two flexible diaphragms 8 and 9 of thin metal with circular concentric corrugations 8' to increase the flexibility. By means of these diaphragms, motion may be communicated to the rod 5 from outside the apparatus without loss by friction or the possibility of leakage of vapor which might occur, if stuffing boxes or pistons were used. Two opposite diaphragms of equal area are here used for the purpose of neutralizing the effect of any variations in vapor pressure, within the chamber, upon the rod 5 and in order to prevent interference with the proper action of the controlling thermostat. The valve 6 is held normally against its seat 7 by a lever 10 pressed against a projection 9' on the diaphragm 9 by the tension of the spring 11, which is adjustable by means of the thumb-nut 12. The chamber 3, by an opening 3' over the reservoir 4, communicates with the multiple diaphragm 13, which consists of a plurality of thin concentrically corrugated metal diaphragm-like disks 13' connected at their centers by tubular members 13'', as shown, to form a continuous passage. The object of this arrangement is, of course, to provide for a large range of motion. As the object of this multiple diaphragm 13 is simply to convert the variations in vapor pressure within the chamber into mechanical motion for the operation of the regulating devices, it is evident that I may replace it by any device capable of performing substantially the same function in substantially the same manner; such as, for example, a different type of diaphragm, or a cylinder and piston, etc. However, as this multiple diaphragm also serves the purpose of a condenser for the vapor generated from the volatile liquid, it would be necessary to provide a separate condenser or else arrange the chamber 3 for that purpose, in the case of the substitution of some device which would not properly perform the function of a condenser.

The upper disk 13ˣ of the multiple diaphragm 13 carries a rod 14, by means of which the motion of the diaphragm is communicated to the lever 15, which is suitably connected to the controlling device. As a safety device, the rod 14 may carry an arm or projection 19 which is attached by means of the spring 20 and the chain 21 to a projection 10' on the lever 10, so that, when any desired limit of the travel of the rod 14 has been reached, the chain 21 will be drawn taut and the lever 10 be pressed more strongly against the diaphragm 9, thereby closing the valve 6 against the action of the thermostat and so preventing any further flow of liquid into the chamber 1 and thus any further rise in pressure. As a further precaution, the rod 14 is shown indirectly connected to the lever 15 through the spring 16, which presses at its upper end against the slidable washer 17 and at its lower end against the fixed projection or collar 18 on the rod 14. This spring 16 is sufficiently stiff to transmit without appreciable distortion the necessary pressure for operating the controlling devices through the lever 15. In case, however, such devices become stuck or, for any reason, the lever 15 cannot be moved, the spring 16 is compressed against the washer 17, allowing the rod 14 to slide through the opening 15' in the lever 15, and thus closing the valve 6 by means of the chain 21.

The operation in detail is as follows: The reservoir 4 normally contains a volatile liquid such as ether, carbon bisulfid, alcohol, water or the like, depending upon the temperature conditions under which the device is to operate. This liquid is chosen to have a boiling point somewhat below the temperature to which the chamber 1 is exposed and which may, for example, be the minimum operating temperature of the heating system at which regulation becomes necessary, but above the temperature to which the multiple diaphragm or condenser is exposed; this may, for example, be the temperature of the boiler room. The valve 6 is normally closed, thereby trapping the liquid in the reservoir 4. If the temperature of the heated area rises above a certain point, a suitable thermostat is brought into action in the manner hereinafter described, whereby pressure is exerted against the projection on the diaphragm 8, thus slightly raising the valve 6 from its seat 7. This movement allows a small quantity of the volatile liquid to trickle through the opening 7' and flow by gravity down through the tube 2, coming into contact with the heated walls of the chamber 1. Here it vaporizes, raising the pressure in the chamber 5 and expanding the multiple diaphragm 13, whereby the rod 14 is raised and the controlling devices are operated through the lever 15. As the temperature of the multiple diaphragm 13, which is located so as to be removed from the influence of the heat surrounding the chamber 1, is lower than the boiling point of the liquid, a continual condensation takes place, the condensed liquid being returned to the reservoir through the opening 3' located in the top of the chamber 3, as shown. As long, however, as the valve 6 is held open by the thermostat, the returned liquid trickles through the opening 3'' in the bottom of the chamber 3 and is again vaporized in the chamber 1, the parts being so proportioned that the desired pressure is maintained against the lever 15 under these conditions. If, on account of a fall in the temperature in the heated area, the thermostat releases the pressure acting upon the diaphragm 8 and allows the valve 6 to be closed by the spring 11, the returning liquid is trapped in the reservoir and prevented from flowing into the chamber 1. As condensation still continues in the multiple diaphragm 13, the vapor pressure rapidly falls again to normal, thereby restoring the lever 15 and the controlling devices controlled thereby. The area of the passage 2 between the chambers 1 and 3, and the area also of that between the chambers 3 and 13, are proportioned so that sufficient space is allowed for the passage of vapor and condensed liquid in opposite directions without appreciable transfer of heat by gaseous convection from chamber 1 to chamber 3.

It is evident that the elements marked 16 to 21, both inclusive, perform the function simply of safety devices and may be dispensed with and the rod 14 may then be directly connected to the lever 15 in any suitable manner, provided necessary precautions are taken to prevent an excessive rise of pressure. For example, the quantity of liquid within the reservoir 4 may be so proportioned that, even if all the liquid above the valve opening 7' is allowed to flow into the chamber 1, the pressure will not rise to a dangerous point; or the valve opening 7' may be made so small that, even when the valve is held continually open, the rate of flow of the liquid into the chamber 1 will be slow enough so that condensation in the multiple diaphragm 13 will prevent excessive pressure; and so on.

As the function of the thermostat is simply to operate the valve 6, it is evident that any form of thermostat capable of doing this may be used. While in order to make clear the principle of operation and the application of my device, I have described certain forms of construction the use of which I consider advantageous, it will be understood that I am not limited to the use of these forms but may employ any other form, provided its functions are essentially those described. I shall now describe one form of thermostat.

Referring again to Fig. 1, the cylindrical wall of the chamber 22 is provided with radiating flanges 22' to increase the sensitiveness; and this chamber 22 is located at the point from which the temperature is to be controlled. A flexible diaphragm 23, which is similar to the diaphragms 8 and 9 and against which the lever 25 is pressed by the spring 26, is adjustable by means of the thumb nut 27, which engages the threaded end of a pin 26' to which one end of the spring 26 is attached and which passes slidably through a hole 26'' in the bracket-arm 25' that projects from the box 22. The other end of the lever 25 is connected by the chain 28 to the lever 29 which is fulcrumed at 29' on a bracket 29'' and which bears against the diaphragm 8. The chamber 22 is partly filled with a liquid the boiling point of which is below the minimum temperature of the range over which the thermostat is required to work. There will exist then in the chamber 22, at any temperature within this range, a certain pressure which is the vapor pressure of the given liquid at that temperature. The diaphragm 23 is held against the stop 24 by the tension of the spring 26. This spring tension is so adjusted by the thumb nut 27 that, when the temperature surrounding the thermostat rises to the point at which it is desired the thermostat shall operate the valve 6, the vapor pressure within the chamber 22 forces the diaphragm 23 away from the stop 24, thereby pressing down the lever 25 against the action of the spring 26 and drawing the chain 28 tight and opening the valve 6. When the temperature falls below the critical point, the spring 26 forces the diaphragm back against the stop 24 and releases the tension on the chain 28, allowing the valve 6 to close. In operation the valve 6 is not opened widely and closed again with the variations in temperature at the thermostat, but is rather held a sufficient distance from its seat 7 to allow the liquid to trickle through at a rate which will produce the necessary pressure to hold the controlling devices at the proper point to give the desired temperature.

Fig. 2 shows a modification of the expansion chamber 3 of Fig. 1 for use with a form of thermostat arranged so that the controlling pressure variations are transmitted from the thermostat through a tube containing a gas, liquid or vapor. In Fig. 2, there are shown a section 31 of the expansion chamber corresponding to the chamber 3 of Fig. 1; and the valve-rod 5 which controls the diaphragm 30 corresponding to the diaphragm 8 of Fig. 1. On the outside of the chamber 31 and surrounding the diaphragm 30, there is arranged a chamber 32 which contains a liquid, gas or vapor and is connected by means of the tube 33 with a suitable thermostat (not shown). The pressure variations set up by the thermostat are thus transmitted to the diaphragm 30. With the arrangement shown, the volume of fluid contained between the walls of the chamber 32 and the diaphragm 30 should be as small as possible to minimize variations in pressure due to heat transmitted through the diaphragm. The tube 33 may also be of small bore and curved as shown to prevent transfer of heat by convection. If desirable further to avoid transfer of heat, separate diaphragms suitably connected may be used or the fluid may be kept from contact with the diaphragm by a flexible layer of non-conducting material or the like as will be readily understood by those skilled in the art.

Fig. 3 shows a modification of the structure illustrated in Fig. 1, for use in connection with a form of thermostat with which it is not necessary to neutralize the variations in pressure against the valve-controlling diaphragm due to the variations in vapor pressure in the expansion chamber. The form of thermostat representative of this type is here shown by a coil of tubing or a flanged chamber 34 closed at one end by a flexible diaphragm 35 and connected by means of a tube 36 (preferably of small bore) with the auxiliary chamber 37 formed on the expansion chamber $3^x$. A flexible diaphragm 39 is connected to the valve 40 by the rod 41. This valve 40 is normally held against its seat 40' by the spring 42 which presses at one end against the valve 40 and at its other end against a lug 43 through which passes a guiding rod 44. The diaphragm 35 is pressed upwardly by the spring 46 and its upper surface is in contact with the screw 47. The chamber 34, the tube 36 and the space $39^x$ beneath the diaphragm 39 are entirely filled with a suitable fluid, such as an oil having a high coefficient of expansion. The pressure of the liquid in the chamber 34 and against the diaphragm 39 is adjusted by means of the screw 47, which bears against the flexible diaphragm 35. This screw 47 is so adjusted that, when the temperature in the chamber 34 rises to the point at which it is desired the thermostat shall operate, the increase in pressure due to the expansion of the liquid in the thermostat will raise the valve 40 (preferably of large area) against the pressure of the spring 42. This allows the volatile liquid contained in the expansion chamber $3^x$ to flow into the auxiliary chamber 37 and thence through the by-pass or opening 48, into the tube 2' and finally into the vessel or chamber 1, as in the structure illustrated in Fig. 1. The tube 2' is extended above the level of the liquid in the expansion chamber $3^x$ to prevent the condensed vapor returned from the multiple diaphragm or condenser 13 from reaching the chamber 1 except through the valve 40. The multiple diaphragm 13 is connected to the controlling apparatus through the rod 11 in any suitable manner. Since practically incompressible liquid is employed in the thermostat, and as the diaphragm 35 bears firmly against the screw 47 at all times, the variations in pressure against the upper surface of the valve-controlling diaphragm 39 due to variations in vapor pressure in the expansion chamber $3^x$ do not interfere with the action of the thermostat, and a compensating diaphragm is not necessary. It is desirable however that the chamber 34, the tube 36 and space $39^x$ be entirely filled with the liquid; for, a small air-pocket would take up the variations in volume of the liquid so that the valve would not be operated. The same desirability of minimizing the transfer of heat through the diaphragm 39 exists, of course, as in the arrangement shown in Fig. 2.

Fig. 4 shows a safety device which is of a different type and which is illustrated as applied to the arrangement shown in Fig. 3. The chamber 50 is closed at its top by the flexible diaphragm 51, which is connected to the valve 52 by the rod 53. The bottom of this chamber 50 is connected to a flexible diaphragm 54 which is located in the bottom of the chamber 55 and which is held against the stop 56 by means of the spring 57. The tube 58 is connected with the chamber 50 and a thermostat (not shown) and is formed into a coil $58^x$ within the chamber 55, as shown, to provide flexibility. Normally the operation is the same as that of the structure shown in Fig. 3, the valve 52 being raised by the diaphragm 51, and thereby allowing the volatile liquid to flow through the by-pass 59 into the tube 2''. The pressure of the spring 57 is so adjusted, however, that, in case the pressure within the expansion chamber 55 becomes excessive, the diaphragm 54 is forced downwardly and away from the stop 56, thus lowering the chamber 50 and closing the valve 52 and thereby stopping the flow of liquid. Such a safety device may, however, be dispensed with by properly proportioning the quantity of volatile liquid, size of openings, etc., as described in connection with the structure shown in Fig. 1.

It will be understood that, in the drawings illustrating my invention, I have for the sake of clearness shown only the essential features and have not attempted to incorporate details of design or mechanical construction and that the arrangement of the parts may vary widely from that shown, provided the essential features remain the same. Also, it will be understood that the controlling devices to be operated by this apparatus and the means of transmitting motion or pressure to same may be of any desired type and, furthermore, that auxiliary devices other than those described may be employed; as, for example, thermostats with time-operation features may be used.

This apparatus may be employed for any purpose of regulation in which a temperature variation is the determining factor by placing the thermostat so that it will be exposed to the action of such temperature variation and arranging so that the movements of the multiple diaphragm (or similar device) are communicated to suitable devices for regulating draft, supply of fuel, flow of liquids from the tanks, etc.

With regard to the advantages which I claim for the above-described system over existing systems, it will be noted that the thermostat is only required to open slightly a small valve, which is practically balanced, as the vapor pressure on both sides is the same, thus giving a sensitiveness equal to those systems in which a thermostat is used to trip a weight and start a motor or clockwork, without the disadvantage of requiring winding, renewal of batteries, etc. There is the further advantage that, with the arrangement described, the controlling devices are held at a point to maintain the proper temperature with slight movements in either direction, instead of being shifted back and forth over a considerable range, thus giving closer regulation and greater economy of fuel when applied to the regulation of the draft of a furnace or boiler.

The use of the thermostatically-controlled valve for bringing by gravity a volatile liquid into contact with a source of heat and its removal by evaporation and condensation, makes available for producing the mechanical forces necessary to operate controlling devices the entire range of temperature between the external and internal temperatures of a heating system, thus giving, with respect to positive and reliable operation, a great advantage over systems in which the considerable mechanical force necessary to properly operate the controlling devices must be generated directly by the small allowable variations in the temperature which is to be controlled.

With regard to the mechanical features of the system it will be noted that the use of flexible diaphragms as described obviates the maintenance difficulties and possibility of leakage due to use of stuffing-boxes and, furthermore, that only one valve is necessary for the operation of the system and that this valve is not required to remain tight against gas or vapor pressure but only against the hydrostatic pressure of an inch or so of liquid, thus requiring practically no attention. While I consider the use of a flexible diaphragm or diaphragms as described to be a very desirable means of actuating the valve of the apparatus, it will be understood that other suitable means may be employed if desired.

I claim:

1. An apparatus for the automatic regulation of heating systems, including a reservoir for holding a volatile substance; a vaporizing chamber adapted to receive the latter; means controlling the flow of the volatile substance from said reservoir to said chamber; a thermostat for controlling said means; and heater-controlling mechanism actuated by the pressure of the vapor into which said substance is converted by the heat of said chamber.

2. An apparatus for the automatic regulation of heating systems, including a reservoir for holding a volatile substance; a vaporizing chamber adapted to receive the latter; means controlling the flow of the volatile substance from said reservoir to said chamber; a thermostat for controlling said means; an expandible device which is in communication with said chamber and is adapted to receive the vapor flowing therefrom; and heater-controlling mechanism actuated by said device.

3. An apparatus for the automatic regulation of heating systems, including a reservoir for holding a volatile substance; a vaporizing chamber adapted to receive the latter; a valve controlling the flow of the volatile substance from said reservoir to said chamber; a thermostat for controlling said valve; and heater-controlling mechanism actuated by the pressure of the vapor into which said substance is converted by the heat of said chamber.

4. An apparatus for the automatic regulation of heating systems, including a reservoir for holding a volatile substance; a vaporizing chamber adapted to receive the latter; means for controlling the flow of the volatile substance from said reservoir to said chamber; a thermostat for controlling said means; a safety device for controlling said means; and heater-controlling mechanism actuated by the pressure of the vapor into which said substance is converted by the heat of said chamber.

5. An apparatus for the automatic regulation of heating systems, including a reservoir for holding a volatile substance; a vaporizing chamber adapted to receive the latter; means controlling the flow of the volatile substance from said reservoir to said chamber; a thermostat for controlling said means; a condenser for condensing the vapor flowing from said chamber; and heater-controlling mechanism actuated by the pressure of the vapor into which said substance is converted by the heat of said chamber.

In testimony whereof I have hereunto set my hand at Chicago, Illinois, this seventh day of April A. D., 1914, in the presence of the two undersigned witnesses.

JULIAN A. STRATTON.

Witnesses:
GREGORY H. WICK,
MARY A. BUSHALL.